United States Patent
Wu et al.

(10) Patent No.: US 7,205,887 B2
(45) Date of Patent: Apr. 17, 2007

(54) TURN INDICATOR UNIT FOR A RELAY-CONTROLLED FLASHER

(75) Inventors: Hsiang-Chen Wu, Tao-Yuan (TW); Ming-Shan Kuo, Kaohsiung Hsien (TW)

(73) Assignee: T.Y.C. Brother Industrial Co., Ltd., Tainan (TW)

( * ) Notice: Subject to any disclaimer, the term of this patent is extended or adjusted under 35 U.S.C. 154(b) by 192 days.

(21) Appl. No.: 10/922,923

(22) Filed: Aug. 23, 2004

(65) Prior Publication Data

US 2006/0038697 A1 Feb. 23, 2006

(51) Int. Cl.
*B60Q 1/22* (2006.01)

(52) U.S. Cl. .................. 340/463; 340/475; 315/77; 200/61.27

(58) Field of Classification Search ............... 340/463
See application file for complete search history.

(56) References Cited

U.S. PATENT DOCUMENTS

| | | | | |
|---|---|---|---|---|
| 4,910,496 A | * | 3/1990 | Hatanaka et al. | 340/458 |
| 5,414,407 A | * | 5/1995 | Gerrans et al. | 340/475 |
| 5,614,884 A | * | 3/1997 | Evans | 340/475 |
| 5,633,565 A | * | 5/1997 | Friedman et al. | 315/200 A |
| 6,069,559 A | * | 5/2000 | Davis et al. | 340/475 |
| 6,515,584 B2 | * | 2/2003 | DeYoung | 340/475 |
| 6,714,128 B2 | * | 3/2004 | Abbe et al. | 340/468 |
| 6,844,681 B2 | * | 1/2005 | Serizawa et al. | 307/10.8 |
| 6,927,683 B2 | * | 8/2005 | Sugimoto et al. | 340/475 |
| 2004/0183462 A1 | * | 9/2004 | Frank et al. | 315/219 |
| 2005/0099286 A1 | * | 5/2005 | DeYoung | 340/463 |

* cited by examiner

*Primary Examiner*—Daniel Wu
*Assistant Examiner*—Eric M. Blount
(74) *Attorney, Agent, or Firm*—Rosenberg, Klein & Lee

(57) ABSTRACT

A turn indicator unit includes a light source, a matching module, and a first switch means. The light source includes a light-emitting diode coupled across an output side of a flasher. The matching module includes a resistor. The switch means connects selectively the resistor across the output side of the flasher when the light-emitting diode of the light source is activated.

5 Claims, 4 Drawing Sheets

TURN INDICATOR UNIT FOR A RELAY-CONTROLLED FLASHER

BACKGROUND OF THE INVENTION

1. Field of the Invention

The invention relates to a turn indicator unit, more particularly to a turn indicator unit for a relay-controlled flasher.

2. Description of the Related Art

A conventional turn indicator for indicating the direction in which a vehicle is about to turn includes at least a pair of lamps. Typically, each of the lamps is connected across an output side of a relay-controlled automotive flasher.

In operation, when the lamps are operational, the load resistance across the output side of the automotive flasher is equal to the sum of the resistances in parallel of the individual lamps. The automotive flasher operates such that each of the lamps flashes in the 1 to 2 Hz frequency range. When either one of the lamps fails, the load resistance across the output side of the automotive flasher is equal to the resistance of the functioning lamp. In this case, the automotive flasher operates such that the functioning lamp flashes in the 3 to 5 Hz frequency range.

Although the conventional turn indicator achieves its intended purpose, the use of a lamp as a turn indicator is outdated. Moreover, lamps consume a large amount of power and have a relatively short service life.

SUMMARY OF THE INVENTION

Therefore, the object of the present invention is to provide a turn indicator that can overcome the aforesaid drawbacks of the prior art.

According to the present invention, a turn indicator unit includes a light source, a matching module, and a switch means. The light source includes a light-emitting diode that is adapted to be coupled across an output side of a flasher. The matching module includes a resistor. The switch means serves to connect selectively the resistor across the output side of the flasher when the light-emitting diode of the light source is activated.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
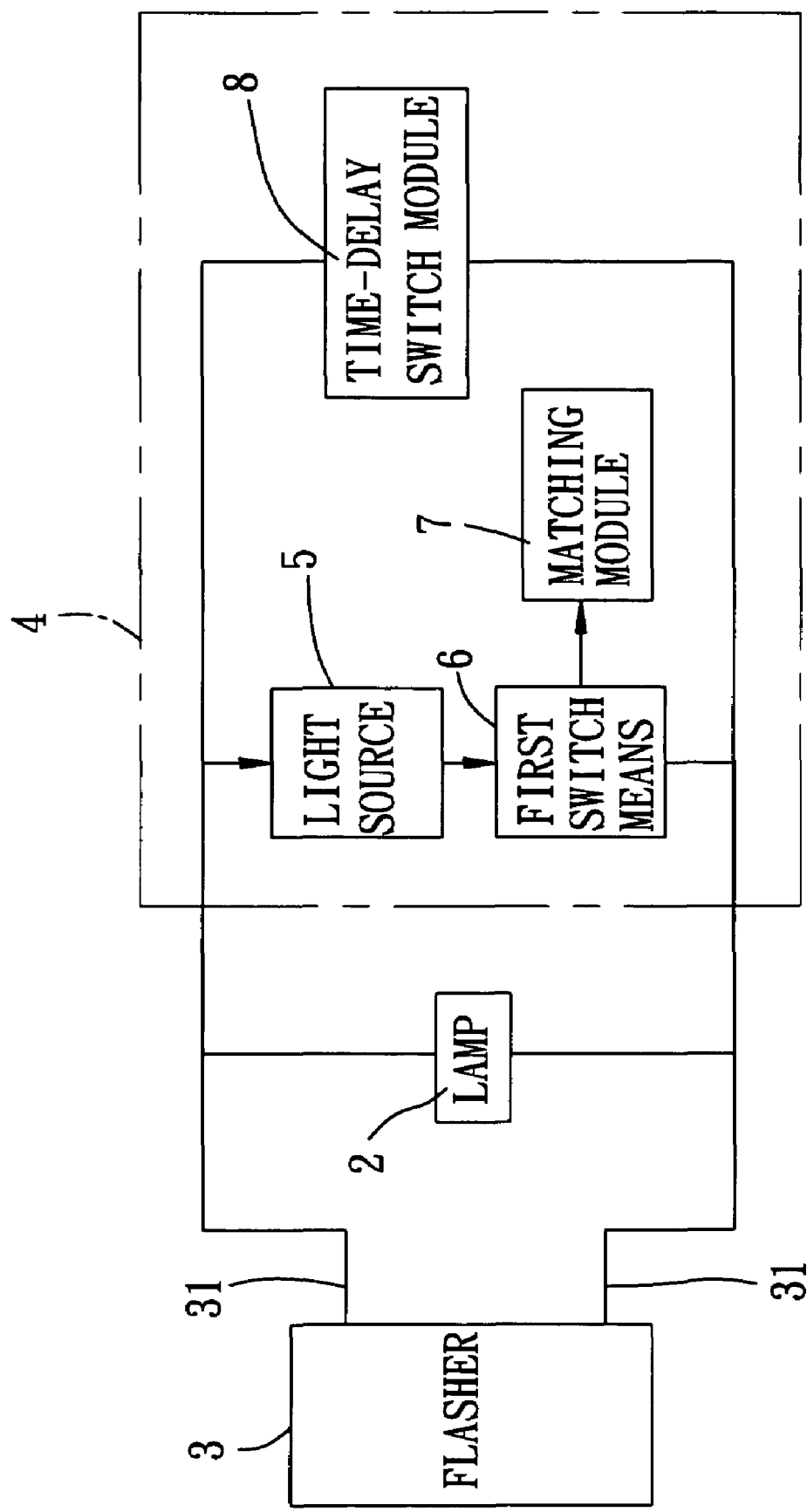
FIG. 1 is a schematic circuit block diagram of the first preferred embodiment of a turn indicator unit according to the present invention.

Before the present invention is described in greater detail, it should be noted that like elements are denoted by the same reference numerals throughout the disclosure.

Figure 2:
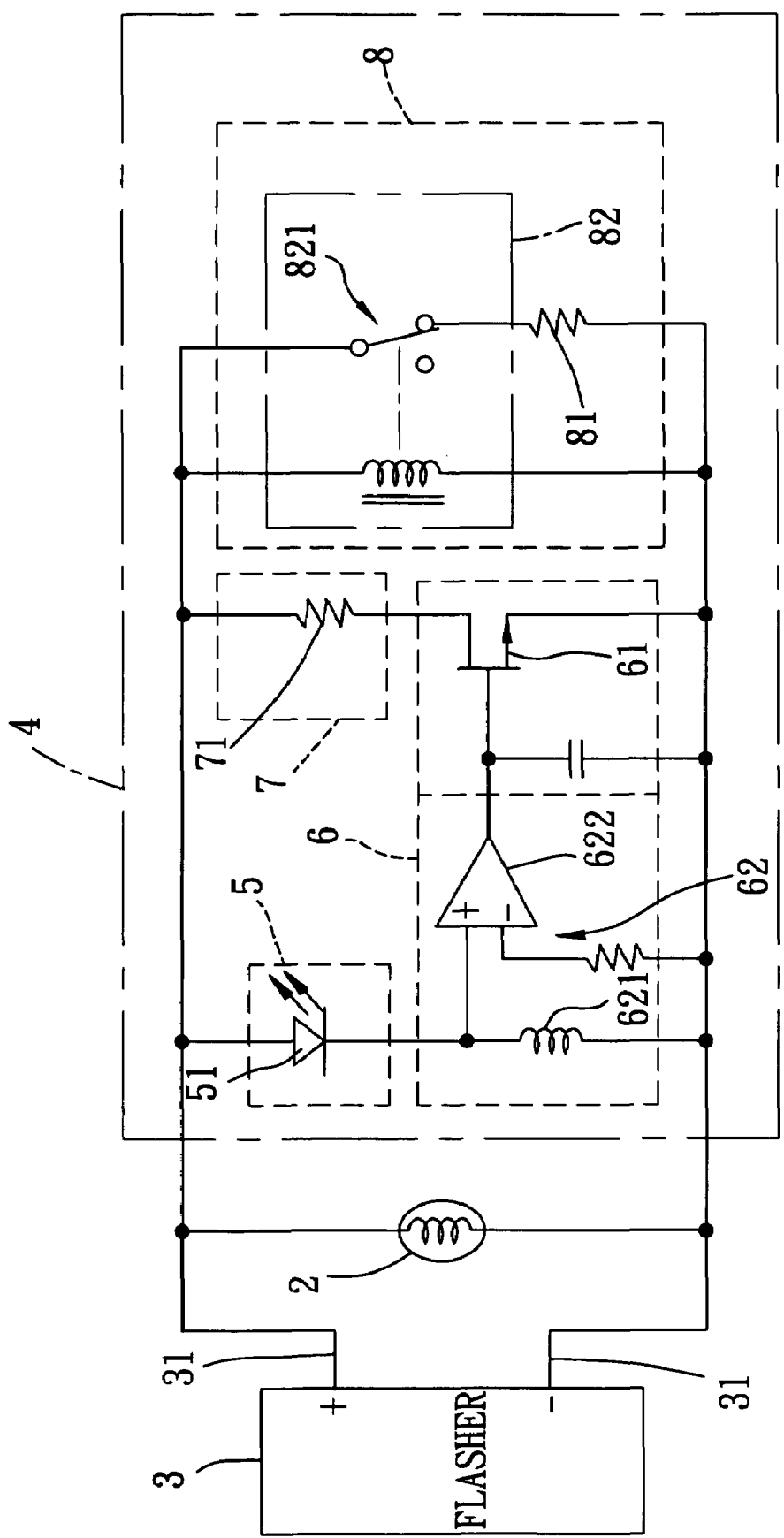
FIG. 2 is a schematic circuit diagram of the first preferred embodiment.

Referring to FIGS. 1 and 2, the first preferred embodiment of a turn indicator unit 4 according to this invention is shown to include a light source 5, a matching module 7, and a first switch means 6.

The turn indicator unit 4 in this embodiment is for use with a flasher 3, such as a relay-controlled automotive flasher. The flasher 3 has an output side 31. A lamp 2 is coupled across the output side 31 of the flasher 3.

The light source 5 is adapted to be coupled across the output side 31 of the flasher 3. In this embodiment, the light source 5 includes a light-emitting diode 51. It is noted that although the light source 5 in this embodiment is exemplified using only the single light-emitting diode 51, it should be apparent to those skilled in the art that the number of these elements may be increased as required.

The matching module 7 includes a first resistor 71 that has a resistance substantially equal to that of the lamp 2.

The first switch means 6 serves to connect selectively the first resistor 71 across the output side 31 of the flasher 3 when the light-emitting diode 51 of the light source 5 is activated. In this embodiment, the first switch means 6 includes a switch 61 that is adapted to connect the first resistor 71 across the output side 31 of the flasher when actuated, and an actuator 62 that is coupled to the light source 5 and the switch 61 and that is operable so as to actuate the switch 61 when the light-emitting diode 51 of the light source 5 is activated. In particular, the switch 61 is a metal-oxide silicon field-effect transistor (MOSFET). The switch 61 has a gate terminal, a source terminal connected in series with the first resistor 71, and a drain terminal. The first resistor 71 and the drain terminal of the switch 61 are adapted to be coupled across the output side 31 of the flasher 3. The actuator 62 includes an inductor 621 and an operational amplifier 622. The inductor 621 is connected in series with the light-emitting diode 51. The series connection of the light-emitting diode 51 and the inductor 621 occurs across the output side 31 of the flasher 3. The operational amplifier 622 has inverted and non-inverted inputs coupled across the inductor 621, and an output connected to the gate terminal of the switch 61.

The turn indicator unit 4 further includes a time-delay switch module 8. In this embodiment, the time-delay switch module 8 includes a second resistor 81 and a second switch means 82. The second switch means 82 serves to connect the second resistor 81 across the output side 31 of the flasher 3 within a predetermined time period, e.g. 10 milliseconds, when the light-emitting diode 51 of the light source 5 is activated, and to disconnect the second resistor 81 from the output side 31 of the flasher 3 after the predetermined time period has elapsed. In particular, the second switch means 82 includes a normally close relay 821. The relay 821 has an input, which is a coil, adapted to be coupled across the output side 31 of the flasher 3, and an output, which is a single-pole single-throw switch, connected in series with the second resistor 81. The series connection of the second resistor 81 and the output of the relay 821 occurs across the output side 31 of the flasher 3.

The operation of the turn indicator unit 4 of this invention, in the case where both the lamp and the light-emitting diode 51 are operational, is as follows:

1. Prior to operation of the flasher 3, the load resistance across the output side 31 of the flasher 3 is equal to the sum of the resistances in parallel of the lamp 2, the light-emitting diode 51, and the second resistor 81.
2. When the flasher 3 is operated, both the light-emitting diode 51 and the lamp 2 are activated.

3. During the predetermined time period, current flows through the inductor 621.
4. The current through the inductor 621 causes the operational amplifier 622 to generate a high level signal.
5. The high level signal generated by the operational amplifier 622 causes the switch 61 to turn on, thereby connecting the first resistor 71 across the output side 31 of the flasher 3.
6. After the predetermined time period has elapsed, the input of the relay 821 is energized, and the relay 821 is switched open, thereby disconnecting the second resistor 81 from the output side 31 of the flasher 3.

At this time, the load resistance across the output side 31 of the flasher 3 is equal to the sum of the resistances in parallel of the lamp 2, the light-emitting diode 51, and the first resistor 71.

Since the resistance of the light-emitting diode 51 is relatively large compared to that of the lamp 2 and the first resistor 71, and since the resistance of the first resistor 71 is substantially equal to that of the lamp 2, the load resistance is approximately equal to half of the resistance of the lamp 2. At this load resistance, the flasher 3 operates such that each of the lamp 2 and the light-emitting diode 51 flashes in the 1 to 2 Hz frequency range.

It is noted that although the resistance of the first resistor 71 in this embodiment is chosen to be substantially equal to that of the lamp 2, the resistance of the first resistor 71 may be chosen to be less or more than that of the lamp 2 as long as the flasher 3 operates such that each of the lamp 2 and the light-emitting diode 51 flashes in the 1 to 2 Hz frequency range when both the lamp 2 and the light-emitting diode 51 are operational.

The operation of the turn indicator unit 4 of this invention, in the case where the lamp 2 is faulty and where the light-emitting diode 51 is operational, is as follows:
1. Prior to operation of the flasher 3, the load resistance across the output side 31 of the flasher 3 is equal to the sum of the resistances in parallel of the light-emitting diode 51 and the second resistor 81.
2. When the flasher 3 is operated, the light-emitting diode 51 is activated.
3. During the predetermined time period, current flows through the inductor 621.
4. The current through the inductor 621 causes the operational amplifier 622 to generate a high level signal.
5. The high level signal generated by the operational amplifier 622 causes the switch 61 to turn on, thereby connecting the first resistor 71 across the output side 31 of the flasher 3.
6. After the predetermined time period has elapsed, the input of the relay 821 is energized, and hence the relay 821 is switched open, thereby disconnecting the second resistor 81 from the output side 31 of the flasher 3. At this time, the load resistance across the output side 31 of the flasher 3 is equal to the sum of the resistances of the light-emitting diode 51 and the first resistor 81. Since the resistance of the light-emitting diode 51 is relatively large compared to that of the first resistor 81, the load resistance is approximately equal to the resistance of the first resistor 81. At this load resistance, the flasher 3 operates such that the light-emitting diode 51 flashes in the 3 to 5 Hz frequency range. This indicates that the lamp 2 has failed.

The operation of the turn indicator unit 4 of this invention, in the case where the lamp 2 is operational and where the light-emitting diode 51 is faulty, is as follows:

1. Prior to operation of the flasher 3, the load resistance across the output side 31 of the flasher 3 is equal to the sum of the resistances of the lamp 2 and the second resistor 81.
2. When the flasher 3 is operated, during the predetermined time period, the lamp 2 is activated.
3. After the predetermined time period, the input of the relay 821 is energized, and hence the relay 821 is switched open, thereby disconnecting the second resistor 81 from the output side 31 of the flasher 3. At this time, the load resistance across the output side 31 of the flasher 3 is equal to the resistance of the lamp 2. At this load resistance, the flasher 3 operates such that the lamp 2 flashes in the 3 to 5 Hz frequency range. This indicates that the light-emitting diode 51 has failed.

It is noted that, without the time-delay switch module 8, when the lamp 2 is faulty, prior to operation of the flasher 3, the load resistance across the output side 31 of the flasher 3 is equal to the resistance of the light-emitting diode 51. As mentioned above, the resistance of the light-emitting diode 51 is relatively large compared to that of the first resistor 81. At this load resistance, the flasher 31 will not operate. Therefore, the light-emitting diode 51 is never activated. As such, it would be impossible to determine immediately whether only the lamp 2 is faulty, or both the lamp 2 and the light-emitting diode 51 are faulty.

It is also noted that as long as the lamp 2 is operational, the time-delay switch module 8 serves no useful purpose and may be dispensed with.

It is further noted that in an alternative embodiment, the flasher 3 has a built-in frequency control module, which serves as the time-delay switch module. As such, the time-delay switch module 8 is dispensed with.

Figure 3:
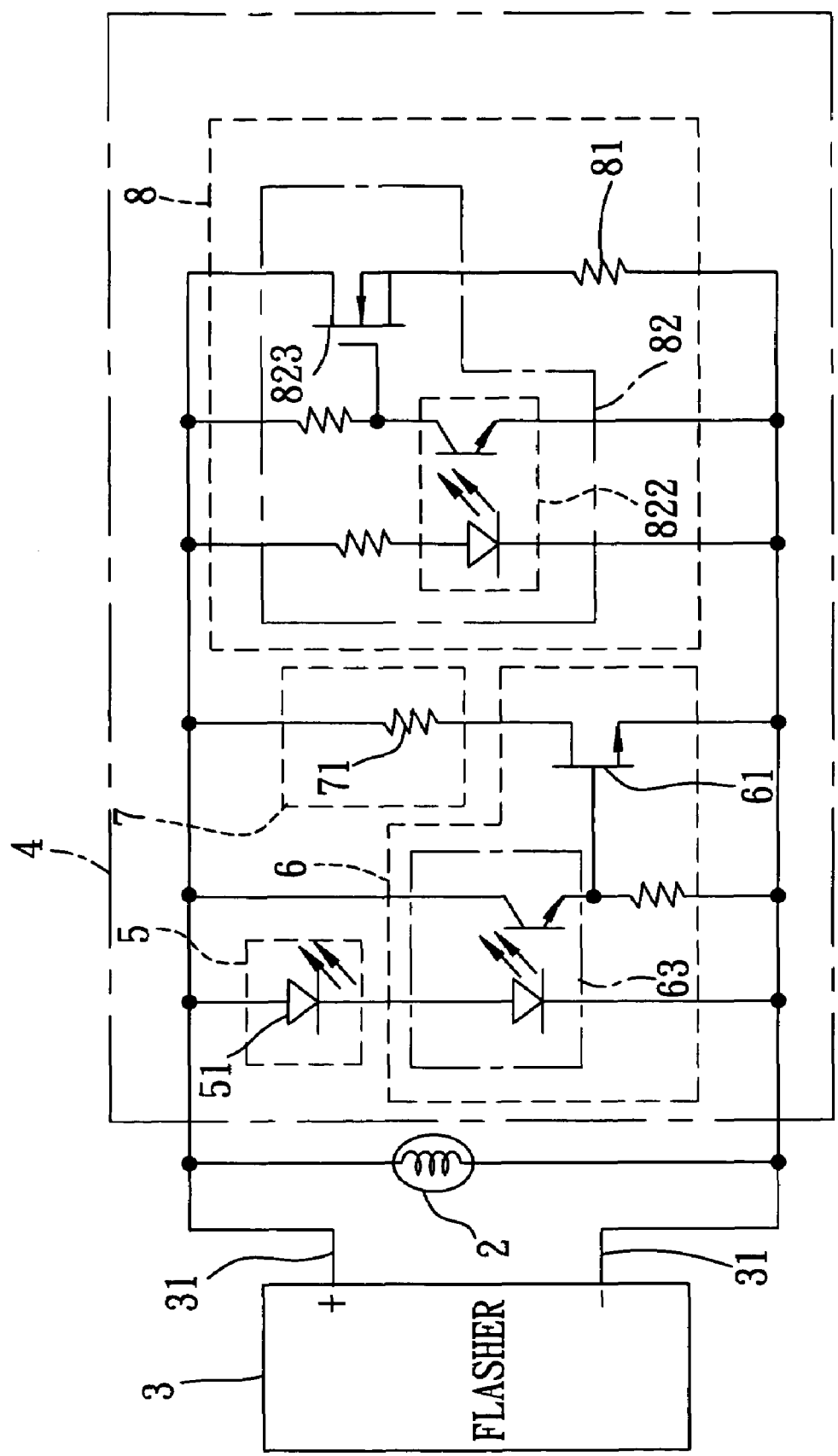
FIG. 3 is a schematic circuit diagram of the second preferred embodiment of a turn indicator unit according to the present invention.

FIG. 3 illustrates the second preferred embodiment of a turn indicator unit according to this invention. When compared with the previous embodiment, the actuator 62 of the first switch means 6 includes an optocoupler 63 that has input, which is a light element, and output, which is a phototransistor. The input of the optocoupler 63 is connected in series with the light-emitting diode 51. The series connection of the light-emitting diode 51 and the input of the optocoupler 63 is adapted to be coupled across the output side 31 of the flasher 3. The output of the optocoupler 63 is adapted to be coupled across the output side 31 of the flasher 3, and is connected to the gate terminal of the switch 61. Moreover, the second switch means 82 of the time-delay switch module 8 includes an optocoupler 822 and a Schottky-barrier field-effect transistor (MESFET) 823. The optocoupler 822 has an input, which is a light element, and an output, which is a phototransistor. Each of the input and output of the optocoupler 822 is adapted to be coupled across the output side 311 of the flasher 31. The MESFET 823 has a gate terminal connected to the output of the optocoupler 822, a source terminal, and a drain terminal connected in series with the second resistor 81. The source terminal of the MESFET 823 and the second resistor 81 are adapted to be coupled across the output side 31 of the flasher 3.

The operation of the first switch means 6 in this embodiment is as follows:
1. When the light-emitting diode 51 is activated, the input of the optocoupler 63 is activated, and hence the output of the optocoupler 63 is turned on.
2. As a result, the switch 61 is turned on, thereby connecting the first resistor 71 across the output side 31 of the flasher 3.

The operation of the time-delay switch module 8 in this embodiment is as follows:
1. When the flasher 3 is operated, the MESFET 823 is turned on, thereby connecting the second resistor 81 across the output side 31 of the flasher 3.
2. During the predetermined time period, the input of the optocoupler 822 is activated, and hence the output of the optocoupler 822 is turned on.
3. After the predetermined time period, the MESFET 823 is turned off, thereby disconnecting the second resistor 81 from the output side 31 of the flasher 3.

Figure 4:
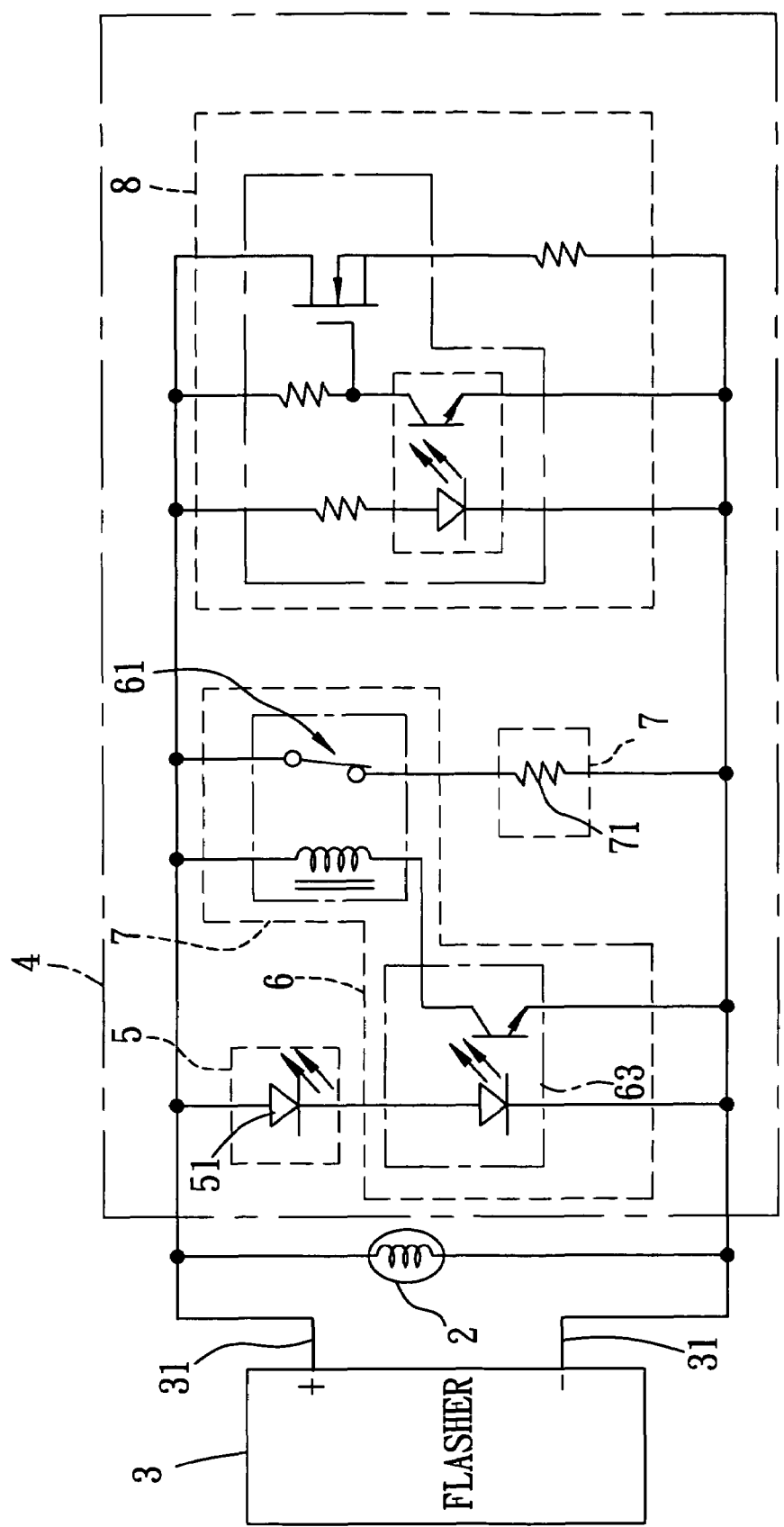
FIG. 4 is a schematic circuit diagram of the third preferred embodiment of a turn indicator unit according to the present invention.

FIG. 4 illustrates the third preferred embodiment of a turn indicator unit 4 according to this invention. When compared with the second embodiment, the switch 61 of the first switch means 6 is a normally open relay that has an input, which is a coil, and an output, which is a single-pole single-throw switch. The input of the switch 61 is connected in series with the output of the optocoupler 63. The series connection of the input of the switch 61 and the output of the optocoupler 63 is adapted to be coupled across the output side 31 of the flasher 3. The output of the switch 61 is connected in series with the resistor 71. The series connection of the output of the switch 61 and the resistor 71 is adapted to be coupled across the output side 31 of the flasher 3.

The operation of the first switch means 6 in this embodiment is as follows:
1. When the light-emitting diode 51 is activated, the input of the optocoupler 63 is activated, and hence the output of the optocoupler 63 is turned on.
2. As a result, the input of the switch 61 is energized, and hence the output of the switch 61 is switched on, thereby connecting the first resistor 71 across the output side 31 of the flasher 3.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. A turn indicator unit comprising:
    a light source including a light-emitting diode adapted to be coupled across an output side of a flasher;
    a matching module including a first resistor;
    a first switch means for connecting selectively said first resistor across the output side of the flasher when said light source is activated, and
    a time-delay switch module electrically connected to an output side of said flasher, said time-delay switch module being activated for a period of time to start said flasher and to activate said light-emitting diode of said light source when said turn indicator unit is activated.
2. The turn indicator as claimed in claim 1, wherein said first switch means includes a switch adapted to connect said first resistor across the output side of the flasher when actuated, and
    an actuator coupled to said light source and said switch, and operable so as to actuate said switch when said light-emitting diode of said light source is activated.
3. The turn indicator as claimed in claim 1, wherein said time-delay switch module includes a second resistor, and
    a second switch means connects said second resistor across the output side of the flasher within a predetermined time period when said light source is activated, and disconnects said second resistor from the output side of the flasher after the predetermined time period has elapsed.
4. A turn indicator unit comprising:
    a light source including a light-emitting diode adapted to be coupled across an output side of a flasher;
    a matching module including a first resistor;
    a first switch means for connecting selectively said first resistor across the output side of the flasher when said light source is activated, and
    a time-delay switch module including a second resistor and a second switch means that connects said second resistor across the output side of the flasher within a predetermined time period when said light source is activated, and disconnects said second resistor from the output side of the flasher after the predetermined time period has elapsed.
5. The turn indicator as claimed in claim 4, wherein said first switch means includes a switch adapted to conned said first resistor across the output side of the flasher when actuated, and
    an actuator coupled to said light source and said switch, and operable so as to actuate said switch when said light-emitting diode of said light source is activated.

* * * * *